United States Patent [19]

Pal et al.

[11] Patent Number: 5,068,280

[45] Date of Patent: Nov. 26, 1991

[54] POLYURETHANE AND/OR POLYUREA DISPERSIONS IN ACTIVE HYDROGEN-CONTAINING COMPOSITIONS

[75] Inventors: Jack M. Pal; James P. Cosman, both of Sarnia; Karen Tan, Kingston, all of Canada

[73] Assignee: The Dow Chemical Company, Midland, Mich.

[21] Appl. No.: 406,000

[22] Filed: Sep. 12, 1989

[51] Int. Cl.$^5$ ............................................ C08L 75/04
[52] U.S. Cl. ............................... 524/728; 252/182.27; 521/115; 521/137; 524/757; 524/762; 525/458
[58] Field of Search ................... 252/182.27; 521/115, 521/137; 524/757, 762, 728; 525/458

[56] References Cited

U.S. PATENT DOCUMENTS 4,785,026  11/1988  Yeakey et al. ..................... 521/137

Primary Examiner—Maurice J. Welsh
Assistant Examiner—Rachel Johnson

[57] ABSTRACT

Polyurethane and/or polyurea dispersions are prepared by reacting certain coreactants with a polyisocyanate in the presence of a preformed polyurethane and/or polyurea dispersion. The resulting products are especially useful to prepare flexible polyurethane foams which exhibit low shrinkage. In addition, polyurethane and/or polyurea dispersions having a bimodal particle size distribution are disclosed.

23 Claims, No Drawings

POLYURETHANE AND/OR POLYUREA DISPERSIONS IN ACTIVE HYDROGEN-CONTAINING COMPOSITIONS

BACKGROUND OF THE INVENTION

This invention relates to dispersions of polyurethane and/or polyurea particles in an isocyanate-reactive material.

It is known to prepare dispersions of polyurethane particles in isocyanate-reactive materials. This is conveniently accomplished by the in situ reaction of a polyisocyanate with a low equivalent weight hydroxyl-containing "coreactant" (as defined herein) in the isocyanate-reactive material. The isocyanate-reactive material, although having groups which are reactive with the polyisocyanate, is generally a higher equivalent weight material such that the polyisocyanate predominantly reacts with the coreactant to form discrete particles dispersed in the isocyanate-reactive material, which forms a continuous phase. This process is described, for example, in U.S. Pat. No. 4,374,209, incorporated herein by reference. These polyurethane dispersions are commonly known in the art as PIPA polyols, and will be so referred to herein for convenience.

Dispersions of polyurea particles in an isocyanate-reactive material can be prepared in like manner by using certain nitrogen-containing compounds as coreactants, as described, for example, in U.S. Pat. Nos. 4,324,716; 4,310,449; 4,310,448; 4,305,857; and 4,305,858; incorporated by reference. The nitrogen-containing compounds include primary amines, secondary amines, hydrazines, dihydrazides, urea and ammonia. These polyurea dispersions are commonly known in the art as PHD polyols.

The foregoing dispersions can be used to prepare polyurethanes. The dispersion is reacted with a polyisocyanate, usually but not necessarily in the presence of a blowing agent, to form a cured polyurethane polymer. The polyurethanes prepared using these dispersions generally have good properties, particularly in the areas of load-bearing and in certain circumstances flammability, where significant improvements in burn properties, based on tests conducted under laboratory conditions, are often seen compared to polyurethanes made using conventional isocyanate-reactive materials.

A significant problem associated with these dispersions is that their use tends to produce foams which exhibit great amounts of shrinkage. This is particularly seen with the PIPA polyols. Although this invention is not limited to any theory, this phenomenon is believed to be due to poor cell-opening during the foaming process, causing the foam to contain large numbers of closed cells. Since the foam is hot when cured, as the foam cools the gases trapped in the closed cells contract. This in turn causes the pressure in the cells to drop, and the foam shrinks under the pressure of the surrounding atmosphere.

This problem can be partially overcome with the use of special cell-opening additives, or by mechanically crushing the foam after cure. However, these solutions require the use of additional components in the foam formulation, or additional process steps in the manufacturing process, both of which increase manufacturing costs. In addition, with PIPA polyols especially, these methods have found only limited use. Although useful, cell opening additives, most often do not eliminate the need for mechanical crushing. Similarly, crushing does not always fully eliminate the shrinkage, and often the foam must be crushed repeatedly or under severe conditions to adequately open the cells. This sometimes results in splits which render the foam unusable or require that it be repaired.

Another problem with these dispersions is that they tend to have a viscosity which is higher than desired. High viscosity makes these dispersions difficult to process, and limits the solids content of the dispersions.

Because of the other useful properties of PIPA polyols and PHD polyols, it would be desirable to provide a polyurethane and/or polyurea dispersion in an isocyanate-reactive material which provides for improved cell opening when made into polyurethane foam.

SUMMARY OF THE INVENTION

In one aspect, this invention is a dispersion of polyurethane and/or polyurea particles in an isocyanate-reactive material having an equivalent weight of greater than 400, wherein said particles have a bimodal particle size distribution wherein at least about 60 volume percent of the particles fall into two discrete size ranges, about 5 to about 75 volume percent of said particles being larger particles having an average particle size, as measured by hydrodynamic chromatography (HDC), of at least about 2000 Angstroms, and about 25 to about 95 volume percent of the particles being smaller particles having an average particle size, as measured by HDC, of about 100 to about 7000 Angstroms.

In another aspect, this invention is a process for preparing a product polyurethane and/or polyurea dispersion comprising reacting
 (A) a polyisocyanate with
 (B) a coreactant material having a plurality of active hydrogen atoms attached to oxygen or nitrogen atoms and an equivalent weight of about 400 or less, in the presence of
 (C) a preformed solution or dispersion of a material containing urethane and/or urea groups in an isocyanate-reactive material which has an equivalent weight of greater than 400, wherein
  (i) said product dispersion contains about 0.5 to about 40 weight percent solids, based on the weight of the product dispersion, and
  (ii) the material containing urethane and/or urea groups dissolved and or dispersed in the preformed solution or dispersion constitutes from about 0.5 to about 50 percent of the weight of the solids of the product dispersion.

The term "solids" is used herein as a shorthand term to designate the combined weight of (1) the polyisocyanate, (2) the coreactant and (3) material containing urethane and/or urea groups dissolved and/or dispersed in the preformed solution or dispersion. The weight of the dispersed or dissolved material containing urethane and/or urea groups in the preformed solution or dispersion will in normal cases be considered to equal the weight of polyisocyanate and coreactant used in its formation. The term "solids" in not used herein to designate the physical state of any component material or reaction product.

In a third aspect, this invention is a dispersion prepared as described in the preceding paragraphs.

The dispersion of this invention, when used to prepare a polyurethane foam, provides improved cell opening characteristics to the foam, as compared to a similar foam made with a dispersion of like composition, but which is prepared in a conventional one-step process. This advantage is especially seen with the polyurethane dispersions (PIPA polyols) of this invention. In addition, the product dispersion usually has a lower viscosity than conventional dispersions of comparable solids content, and is therefore easier to process. Further, foams prepared from this dispersion often exhibit improved physical properties, better curing and decreased compression sets. Yet another advantage is that with this invention, stable dispersions can be prepared having equivalent weights and reactivities suitable for use in preparing general purpose slabstock foam.

DETAILED DESCRIPTION OF THE INVENTION

As described before, one aspect of this invention is a dispersion in an isocyanate-reactive material of a plurality of polyurethane and/or polyurea particles having a certain bimodal particle size distribution. By "bimodal particle size distribution", it is meant that at least about 60 volume percent of the particles fall into two discreet and separate size ranges which are separated by a particle size range into which relatively few particles fall.

Of the particles falling into the discreet size ranges, the larger particles advantageously have an average particle size from about 2000 to in excess of 10,000, preferably up to about 10,000, more preferably to about 8000 Angstroms. In addition, the smaller of these particles have an average particle size from about 100 to about to about 7000, preferably to about 4000, more preferably to about 2000 Angstroms.

For the purposes of this invention, particle sizes are as determined using hydrodynamic chromatography (HDC), as described, for example in *J. Colloid Interface Science*, Vol. 89, page 94 (1982). All particles sizes refer to the average particle diameters as measured by HDC. In making such measurements, it is suitable to calibrate the device for latex dispersions.

It is understood that the distribution of particle sizes in any dispersion may contain a minor amount of particles having sizes outside the two predominant size ranges. For example, a minor proportion of particles may have sizes larger than, smaller than and/or intermediate to the predominant size ranges. The use of the term "bimodal" herein is not intended to exclude the presence of these minor amounts of off-size particles, provided that at least 60, preferably at least about 80, volume percent of the particles fall into the two predominant size ranges.

The dispersion of this invention has a continuous phase comprising an isocyanate-reactive material having an equivalent weight of greater than 400. The isocyanate-reactive material is any liquid material having a plurality of active hydrogen-containing groups per molecule in which a useful polyurethane and/or polyurea dispersion can be prepared. An active hydrogen-containing group is a group containing at least one hydrogen atom which displays significant activity according to the well-known Zerewitnoff test. Examples of such groups include hydroxyl, thiol, carboxylic acid and primary and/or secondary amine groups. Because the dispersed polymers are formed in situ in the isocyanate-reactive material, it is preferable that the active hydrogen-containing groups be less reactive with a polyisocyanate than the coreactant. For this reason, it is preferred that the isocyanate-reactive material contain substantially only hydroxyl, thiol or carboxylic acid groups, and more preferred that its active hydrogen-containing groups are essentially all primary and/or secondary hydroxyl groups. Isocyanate-reactive materials containing mostly primary hydroxyl groups are most preferred, as such polyols have been found to provide stable dispersions, and also have excellent processing characteristics when used to prepare polyurethanes. However, an advantage of this invention is that stable product dispersions having equivalent weights and reactivities suitable for preparing slabstock polyurethane foam can be made.

The functionality and equivalent weight of the isocyanate-reactive material are advantageously selected in accordance with the desired characteristics of the polyurethane to be prepared therefrom. Generally, the isocyanate-reactive material advantageously has an average functionality (active hydrogen-containing groups/molecule) from about 1.7 to about 16, preferably about 1.8 to about 8. When the dispersion is intended for use in preparing cellular or noncellular elastomeric polyurethanes, an average functionality of about 1.8 to about 4 is more preferred and about 2 to about 3 is most preferred. The isocyanate-reactive material preferably has an equivalent weight from about 400 to about 5000, more preferably about 700 to about 3000, most preferably about 800 to about 2000.

Suitable isocyanate-reactive materials for use as the continuous phase in this invention include those described in Col. 3-5 of U.S. Pat. No. 4,394,491, incorporated herein by reference. Of these, the polyethers, polyesters, hydroxyl-terminated alkanes and glycol ethers are preferred. Particularly preferred are the polyether, especially polymers of $C_2$–$C_4$ alkylene oxides and polymers of tetrahydrofuran. The most preferred polyethers are polymers of propylene oxide, particularly polymers of propylene oxide which are end-capped with about 5 to about 25 weight percent, based on the weight of the polyether, of ethylene oxide.

Often, the continuous phase is a mixture of two or more isocyanate-reactive materials. This often occurs when the product dispersion is prepared using a preformed dispersion containing one isocyanate-reactive material, to which a second isocyanate-reactive material is added during or after the preparation of the product dispersion. In this manner, it is possible to provide a stable dispersion in an isocyanate-reactive material which is suitable for preparing general purpose slabstock polyurethane foam. Isocyanate-reactive materials most suitable for preparing slabstock polyurethane foam are generally polyethers having primarily (>50 percent, preferably >90 percent) secondary hydroxyl groups and an equivalent weight from about 500 to about 2500. Using conventional processes, it has been very difficult to prepare a stable dispersion with these polyethers as the continuous phase. With this invention, the isocyanate-reactive material in the preformed solution or dispersion can be a polyether having a higher (about 40 percent, preferably about 70 percent or more) proportion of primary hydroxyl groups. Then, during the formation of the product dispersion, a substantial quantity of a slabstock polyether is added. The resulting product has as the continuous phase a mixture of polyethers having an average equivalent weight and proportion of primary hydroxyl groups such that it is suitable for the production of general purpose slabstock polyurethane foam.

The dispersed particles are polymers containing a plurality of polyurethane and/or polyurea linkages. Their precise composition depends on the raw materials used in their preparation, as discussed more fully below. The particles are of such molecular weight and crosslinking that they are substantially insoluble in the isocyanate-reactive material. However, it is understood that the dispersion may additionally contain quantities of oligomeric polyurethane and/or polyurea which are soluble in the continuous phase. The more preferred particles are polyurethane or polyurethane/urea particles, especially polyurethane particles, as the conventional PIPA polyols which contain particles of this type present particular cell-opening problems when used to make flexible foam.

The solids content of the dispersion is advantageously about 0.5 to about 40, preferably about 5 to about 30, more preferably about 10 to about 25 percent of the weight of the dispersion.

As stated before, the term "solids", when applied to the product dispersion, refers to the combined weight of the coreactant, polyisocyanate and polyurethane or polyurea containing-material from the preformed solution or dispersion which are used in making the product dispersion. The weight of the polyurethane or polyurea containing material in the preformed solution or dispersion is likewise normally considered to be equal to the combined weight of the coreactant and polyisocyanate used in its manufacture. The exception to this is the case when the preformed solution or dispersion has been centrifuged or otherwise treated to remove part of the polyurethane or polyurea-containing material. In such case, the weight of the polyurethane or polyurea-containing material is determined analytically, or calculated from the initial solids and the amount of material removed.

Another aspect of this invention is a process for preparing polyurethane and/or polyurea dispersions in an isocyanate-reactive material. In this process, the coreactant is reacted with a polyisocyanate in the presence of a preformed polyurethane and/or polyurea solution or dispersion. Further, the weight of the polyurethane and/or polyurea containing material in the preformed solution or dispersion constitutes from about 0.5 to about 50, preferably about 1 to about 35, more preferably about 5 to about 25, percent of the weight of the solids of the product dispersion.

The preformed dispersion has as a continuous phase an isocyanate-reactive material, also as described before. The isocyanate-reactive material present in the preformed dispersion may be the only such material used in preparing the final product. However, it is usually more convenient to prepare a high solids preformed dispersion, since such are more economical to manufacture. This preformed dispersion can then be diluted by adding additional isocyanate-reactive material during the production of the product dispersion. When the preformed dispersion is made in this manner, the isocyanate-reactive material used for dilution may be the same or different as that used in preparing the initial dispersion, but the two isocyanate-reactive materials are preferably compatible. As stated before, the preferred isocyanate-reactive material for both purposes is a poly(propylene oxide) which is end-capped with about 5 to about 25 weight percent ethylene oxide.

However, when making a product dispersion for use in making general purpose slabstock foam, it is most preferred to use a 2–4 functional poly(propylene oxide) which is end-capped with about 5 to about 25 weight percent ethylene oxide to make the preformed solution or dispersion, and a 500–2500 equivalent weight, 2–3 functionality homopolymer of propylene oxide or a random copolymer of propylene oxide and a minor amount of ethylene oxide to dilute same while preparing the product dispersion. The ratio of the two polyethers is advantageously such that of the mixture, less than half the hydroxyl groups are primary hydroxyls. More preferably, the weight ratio of the polyethers is about 1:0.5 to about 1:100, preferably about 1:2 to about 1:50.

The preformed solution or dispersion advantageously contains from about 0.5 to about 40, preferably about 1 to about 30, more preferably about 5 to about 25 weight percent solids. The solids are advantageously the reaction product of a polyisocyanate with a "coreactant", as described hereinafter. Of course, the use of higher solids preformed solution or dispersions will require the addition of more isocyanate-reactive material during the preparation of the product dispersion. The preformed solution or dispersion is advantageously prepared according to the same general procedure as described hereinafter, except of course it is not necessary to use a preformed solution or dispersion in its manufacture. Suitable methods for preparing the preformed dispersion are described, for example, in U.S. Pat. Nos. 4,374,209; 4,324,716; 4,310,449; 4,310,448; 4,305,857; 4,293,470; 4,518,720; 4,518,778; 4,523,025; 4,525,488; 4,785,026; 4,497,913; 4,296,213; 4,506,040; and 4,305,858; incorporated herein by reference.

It is preferred that the particles of the preformed solution or dispersion have an average particle size of at least about 100 Angstroms to about 10,000, more preferably to about 6000, most preferably to about 4000 Angstroms.

The preformed solution or dispersion may be treated to remove some or all of the particulate matter, if desired. It has been found that the advantages of this invention are obtained even when the dispersed polyurethane and/or polyurea particles are removed from the preformed solution or dispersion. Although it is not intended to limit this invention to any theory, it is believed that after removal of particulate matter, there remains in the preformed solution or dispersion a quantity of dissolved polyurethane and/or polyurea polymers or oligomers. The presence of these dissolved materials during the manufacture of the product dispersion provides it with the improved properties discussed before.

The polyisocyanate used in making the dispersion (and the preformed solution or dispersion as well) is any organic compound having at least two, preferably about 2 to about 4 isocyanate groups per molecule. The polyisocyanate may be aliphatic, aromatic or cycloaliphatic, although aromatic types are preferred due to their desirable properties and reactivity. Representative of these types are diisocyanates such as m- or p-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate (and isomers), naphthylene-1,5-diisocyanate, 1-methylphenyl-2,4-phenyldiisocyanate, diphenylmethane-4,4'-diisocyanate, diphenylmethane-2,4'-diisocyanate, 4,4'-biphenylenediisocyanate, 3,3'-dimethoxy-4,4'-biphenylenediisocyanate and 3,3'-dimethyldiphenylpropane-4,4'-diisocyanate; triisocyanates such as toluene-2,4,6-triisocyanate and polyisocyanates such as 4,4'-dimethyldiphenylmethane-2,2',5,5'-tetraisocyanate and the diverse polymethylenepolyphenylpolyisocyanates.

A crude polyisocyanate may also be used in the practice of this invention, such as the crude toluene diisocyanate obtained by the phosgenation of a mixture of toluene diamines or the crude diphenylmethane diisocyanate obtained by the phosgenation of crude diphenylmethanediamine. The preferred undistilled or crude polyisocyanates are disclosed in U.S. Pat. No. 3,215,652, incorporated by reference.

Toluene diisocyanate, diphenylmethane diisocyanate, polymethylene polyphenylene polyisocyanate (PMDI) and their respective derivatives are most preferred.

The coreactant is a material having a plurality of —OH, >NH and/or —NH$_2$ groups and an equivalent weight per active hydrogen atom of up to 400, preferably up to about 300, more preferably up to about 200. Since the coreactant reacts with the polyisocyanate in situ in the isocyanate-reactive material which forms the continuous phase, it is also preferred that the coreactant be more reactive with the polyisocyanate than the isocyanate-reactive material is. Suitable such materials are described, for example, in U.S. Pat. Nos. 4,374,209; 4,324,716; 4,310,449; 4,310,448; 4,305,857; 4,293,470; 4,518,778; 4,523,025; 4,525,488; 4,785,026; 4,497,913; 4,506,040; and 4,305,858; incorporated by reference. Preferred among these are alkanolamines, low equivalent weight amine-initiated polyether polyols, certain alkylene oxide, acrylonitrile, or acrylic ester adducts of amines, primary amines, secondary amines, hydrazines, dihydrazides, urea, ammonia, Mannich condensates, low equivalent weight hydroxyl-terminated compounds such as ethylene glycol, glycerine, glycol ethers, pentaerythritol or the like, aminobenzenes, or mixtures thereof. Of these, the alkanolamines and other hydroxyl-terminated compounds are generally preferred, as the polyurethane dispersions prepared therewith have in the past been found to form polyurethane foams whose cells are especially difficult to open. Thus, the benefits of this invention are particularly evidenced in the preparation of polyurethane dispersions.

Suitable alkanolamines include mono-, di- and trialkanolamines, particularly those wherein the alkanol groups have from about 2 to about 6, preferably about 2 to about 3 carbon atoms. The mono- and dialkanolamines may also have a single N-alkyl substituent, preferably having from about 1 to about 6 carbon atoms. The alkanol and alkyl substituent, when present, may also contain inert substituent groups such as halogen atoms. Preferred among these are monoethanolamine, diethanolamine, triethanolamine, N-methylethanolamine, N-ethylethanolamine, N-butylethanolamine, N-methyldiethanolamine, N-ethyldiethanolamine, N-butyldiethanolamine, monoisopropanolamine, diisopropanolamine, triisopropanolamine, N-methylisopropanolamine, N-ethylisopropanolamine, N-propylisopropanolamine, and the like.

Suitable primary and/or secondary amines include polyhydric aliphatic, arylaliphatic, cycloaliphatic and aromatic amines including, for example, ethylene diamine, 1,2- and 1,3-propylene diamine, tetramethylene diamine, hexamethylene diamine, dodecamethylene diamine, trimethyldiaminohexane, N, N'-dimethylethylenediamine, higher homologues of ethylene diamine such as diethylene triamine, triethylenetetramine and tetraethylenepentamine, homologues of propylene diamine, 4-aminobenzylamine, 4-aminophenylethylamine, piperazine, N, N'-bisaminoethyldipropylene triamine, 1-amino-3,3,5-trimethyl-5-aminomethylcyclohexane, and others as disclosed in U.S. Pat. No. 4,324,716, incorporated herein by reference.

Suitable hydrazines include hydrazine itself and monosubstituted or N,N'-disubstituted hydrazines having as substituent groups $C_1$–$C_6$ alkyl, cyclohexyl or phenyl groups. Hydrazine itself is preferred among these.

Suitable hydrazides include the hydrazides of multifunctional carboxylic acids such as carbonic acid, oxalic acid, malonic acid, succinic acid, adipic acid, sebacic acid, azelaic acid, maleic acid, fumaric acid, phthalic acid, isophthalic acid and terephthalic acid; the esters of a hydrazine monocarboxylic acid with dihydric or polyhydric alcohols and phenols; and the amides of hydrazinomonocarboxylic acids. These hydrazides preferably have a molecular weight from about 90 to about 1000.

The reaction of the coreactant with the polyisocyanate is preferably done by mixing the preformed dispersion and coreactant, and then adding the polyisocyanate to the resulting mixture. The reactants are advantageously mixed at any temperature at which the mixture is a liquid and at which the reactants do not degrade, but are preferably mixed at about 0 to about 170° C., more preferably about 15 to about 70° C. and most preferably about 15 to about 45° C.

The isocyanate and coreactant are advantageously mixed with stirring, in order to promote the formation of a plurality of small particles. Usually, rapid agitation is desired to optimize particle size and minimize the viscosity of the resulting dispersion. The process can be conducted batch-wise or continuously, as described in U.S. Pat. No. 4,374,209.

The ratio of polyisocyanate and coreactant is selected such that they react to form a plurality of particles dispersed in the isocyanate-reactive material. Advantageously, sufficient of the polyisocyanate is provided to react with in excess of one active hydrogen atom/molecule of the coreactant, and preferably from about 1.5 to about 3 active hydrogen atoms/molecule of the coreactant.

The reaction between the polyisocyanate and the coreactants is often exothermic, and proceeds rapidly, being essentially completed in most cases in about 1 minute to about 1 hour, preferably about 1 to about 30 minutes, although this depends somewhat on the choice of polyisocyanate and coreactant, the batch size, initial temperature and other variables. Agitation is preferably effected throughout the reaction period.

If desired, a catalyst for the reaction between the polyisocyanate and the coreactant may be used to accelerate the reaction. Suitable catalysts include those described below with respect to the use of this dispersion to prepare polyurethanes, with the organotin catalysts being preferred. The amount of catalyst is advantageously up to about 1 weight percent based on polyol, preferably up to about 0.1 weight percent and more preferably up to about 0.05 weight percent. However, the catalyst may not be necessary, particularly with the more reactive coreactants.

As discussed in U.S. Pat. Nos. 4,374,209 and 4,324,716, it is possible, although not preferred, to provide increased control over the molecular weight of the dispersed particles through the use of a minor quantity of monofunctional reactants, i.e., a monofunctional isocyanate and/or a monofunctional coreactant. Exemplary monoisocyanates include cyclohexyl isocyanate, phenyl isocyanate, toluene monoisocyanate, 4-chlorophenyl isocyanate and diisopropylphenyl isocyanate. Exemplary monofunctional coreactants include dialkyl amines such as dimethylamine, diethylamine, dibutylamine and the like; N-dialkylalkanolamines such as dimethylethanolamine, diethylethanolamine, and the like. When used, these monofunctional reactants constitute only a minor portion, based on equivalents, of the total amount of reactant used.

In preparing the dispersion, sufficient polyisocyanate and coreactant are used that, together with the solids from the preformed solution or dispersion, the product dispersion has the desired solids level. As stated before, the solids advantageously constitute about 0.5 to about 40, preferably about 5 to about 30, more preferably about 10 to about 25 percent of the weight of the product dispersion.

The product prepared according to the process of this invention is in most cases an opaque liquid containing a continuous phase in which are dispersed a plurality of polyurethane and/or polyurea particles. Usually, but not always, the product has particles having a bimodal size distribution as described before.

The dispersion of this invention is useful for preparing polyurethanes by reacting it with a polyisocyanate. The dispersion of this invention is particularly suited for preparing flexible polyurethane foams.

The preparation of polyurethanes from isocyanate-reactive materials is well-known, and described, for example, in U.S. Pat. Nos. 4,269,945; 4,632,943; 4,596,665; and 4,774,040; incorporated herein by reference. In general, the dispersion of this invention can be reacted with polyisocyanates in the same way as other polymer-modified isocyanate-reactive materials to form polyurethanes.

The polyisocyanate used in preparing the polyurethane is as described before, although the particular polyisocyanate used in the polyurethane production may be the same or different that that used in preparing the dispersion. For most applications, toluene diisocyanate (TDI), diphenylmethanediisocyanate (MDI), polymethylene polyphenylene polyisocyanates (PMDI), isophorone diisocyanate, hydrogenated MDI and PMDI, cyclohexane diisocyanate and their respective derivatives are preferred on the basis of cost and desirable properties, with TDI, MDI and PMDI and their derivatives and prepolymers being especially preferred.

In addition to the dispersion of this invention and the polyisocyanate, other components can be used in the preparation of polyurethanes. The selection of these depends to a great extent on the type of polyurethanes desired, as is well understood in the art.

In making flexible polyurethane foams, it is often useful to employ an additional polyol, a blowing agent or mixture thereof, a cell opener, a catalyst as described below, a surfactant to stabilize the foaming reaction mixture until it is sufficiently cured to maintain its shape, and/or a crosslinker or chain extender, as well as other additives which are useful in preparing polyurethane. Suitable materials and processes for preparing flexible foam are disclosed, for example, in U.S. Pat. No. 4,596,665, incorporated herein by reference. In making flexible foam, it is especially desired to employ a formulation comprising a dispersion wherein the isocyanate-reactive material is a polyether polyol an average equivalent weight of about 800 to about 2000, from about 1 to about 6 parts water per 100 parts relatively high equivalent weight isocyanate-reactive material(s), toluene diisocyanate and/or diphenylmethanediisocyanate or derivatives thereof, organotin and/or tertiary amine catalyst, and up to 5 parts of a crosslinker or chain extender per 100 parts relatively high equivalent weight isocyanate-reactive material. In this formulation, it is preferred to dilute the dispersion of this invention with additional relatively high equivalent weight polyether polyol, particularly if the dispersion contains more than about 10 weight percent dispersed particles.

Other types of polyurethanes can be made using the dispersion of this invention. In making noncellular or microcellular elastomers, additional relatively high equivalent weight active hydrogen-containing materials, chain extenders, crosslinkers, mold release agents, small quantities of blowing agents (in the case of microcellular elastomers), catalysts, fillers, reinforcing fibers and similar additives are advantageously used.

The most widely used and preferred catalysts are the tertiary amine catalysts and the organometallic catalysts. Exemplary tertiary amine catalysts include, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-diethyl-3-diethylaminopropylamine, dimethylbenzyl amine, bis(2-dimethylaminoethyl)ether, and the like. Tertiary amine catalysts are advantageously employed in an amount from about 0.01 to about 5, preferably about 0.05 to about 2 parts per 100 parts by weight of the relatively high equivalent weight active hydrogen-containing materials.

Exemplary organometallic catalysts include organic salts of metals such as tin, bismuth, iron, mercury, zinc, lead and the like, with the organotin compounds being preferred. Suitable organotin catalysts include dimethyltindilaurate, dibutyltindilaurate, stannous octoate and the like. Other suitable catalysts are taught, for example, in U.S. Pat. No. 2,846,408. Advantageously, about 0.001 to about 0.5 part by weight of an organometallic catalyst is used per 100 parts of relatively high equivalent weight active hydrogen-containing materials.

Suitable such crosslinkers include alkanolamines and other compounds of about 200 or lower equivalent weight having about 3–8, preferably about 3–4 active hydrogen-containing groups per molecule. Exemplary such compounds are glycerine and trimethylolpropane, as well as other alkylene triols. Preferred, however, are alkanolamines such as diethanolamine, triisopropanol-amine, triethanolamine, diisopropanol-amine, adducts of 4–8 moles of ethylene oxide and/or propylene oxide with ethylene diamine and the like, and polyamines such as methylene bis(o-chloroaniline), ethylenediamine, ammonia and the like. Most preferred, on the basis of its optimum reactivity, is diethanolamine. The amount used depends to a large extent on the type of polyurethane being prepared. In preparing the preferred flexible polyurethane foam, advantageously up to about 10, preferably up to about 5, more preferably about 0.1 to about 4 parts of the crosslinker are advantageously employed per 100 parts of relatively high equivalent weight isocyanate-reactive materials.

"Chain extenders", for the purposes of this invention, include compounds having two active hydrogen-containing groups per molecule and an equivalent weight from about 31 to about 300, preferably about 31 to about 150. Hydroxyl-containing chain extenders include the alkylene glycols and glycol ethers such as ethylene glycol, 1,3-propylene glycol, 1,4-butylene glycol, 1,6- hexamethylene glycol, diethylene glycol, triethylene glycol, dipropylene glycol, tripropylene glycol, 1,4-cyclohexanedimethanol and the like. Amine chain extenders include diethyltoluenediamine, phenylene diamine, methylene bis(o-chloroaniline), NaCl blocked methylene bis(aniline), toluene diamine, aromatic diamines which are substituted at least one of the carbon atoms adjacent to the amine groups with a lower alkyl group, and the like. Such chain extenders, when used in making the preferred flexible foam, are advantageously employed in amounts similar as described with respect to the crosslinkers, although significantly higher amounts are often used in making noncellular and microcellular elastomers.

In preparing foams, a surfactant may be used to stabilize the foaming reaction mixture against cell collapse until the mixture is sufficiently cured to maintain its configuration. Suitable surfactants include siloxane/poly(alkylene oxide) copolymers as described, for example, in U.S. Pat. Nos. 3,887,500 and 3,957,842. The selection and use of such surfactants in preparing foams is well-known in the art. The surfactant is advantageously used in an amount from about 0.01 to about 2, preferably about 0.2 to about 1.5, parts per 100 parts of relatively high equivalent weight isocyanate-reactive material.

Suitable blowing agents include materials which are capable of generating a gas under the conditions of the reaction of a polyisocyanate and a polyol. Such materials include air, carbon dioxide, nitrogen, water, formic acid, low-boiling halogenated alkanes, finely divided solids, the so-called "azo" blowing agents such as azo-bis(formamide) and the like. Preferred are water, the low-boiling halogenated alkanes, or mixtures thereof. In preparing low density foam, the blowing agents are advantageously employed in a quantity sufficient to provide the foam with a bulk density from about 0.5, preferably about 0.9, more preferably about 1.1 to about to about 25, preferably about 6, more preferably about 4 pounds per cubic foot. When water is used as the sole blowing agent, such densities are commonly obtained with the use of about 1.0 to about 8, preferably about 1.5 to about 5 parts of water per 100 parts relatively high equivalent weight compound. The halogenated alkanes, including methylene chloride, dichlorodifluoromethane, monochlorodifluoromethane, monochlorotrifluoromethane and the like, generally provide the desired density when employed in amounts from about 5 to about 50 parts per 100 parts relatively high equivalent weight compound. Lesser amounts are useful when employed in conjunction with another blowing agent, such as water.

The resulting polyurethanes, depending on type, are useful as cushioning materials, furniture padding, bedding, packaging materials, automobile fascia, dynamic elastomers such as automobile engine belts, and the like.

The following examples are given to illustrate the invention and should not be interpreted as limiting it in any way. Unless stated otherwise, all parts and percentages are given by weight.

EXAMPLE 1

A. Preparation of Preformed Dispersion

In a suitable reactor is placed a mixture of 900 parts Polyol A, 0.1 part dibutyltindilaurate and 42.9 parts triethanolamine. Polyol A is a 5000 molecular weight, nominally trifunctional poly(propylene oxide) having about 16 percent by weight terminal poly(ethylene oxide) capping. This mixture is maintained at a temperature of 25° C. With stirring, 57.1 parts of TDI (80/20 mixture of 2,4- and 2,6-isomers) is added over about 15 seconds. Stirring is continued for about 15 minutes. During this time, an exotherm and viscosity increase are observed. About 15 minutes after the TDI is added, the product is permitted to cool. The resulting dispersion is smooth and free of visible lumps. It contains about 10 percent dispersed polyurethane having an average particle size of about 2200 Angstroms and has a viscosity of about 3100 centipoises (cps) at 25° C. For convenience, this dispersion is referred to herein as "Preformed Dispersion A".

B. Preparation of Dispersions Using the Preformed Dispersion

Five hundred parts of Preformed Dispersion A are diluted with 350 parts Polyol A, in which 0.15 part of dibutyltindilaurate is dissolved. This diluted dispersion is then mixed with 67 parts triethanolamine and heated to 48° C. With stirring, 83 parts of TDI are added over 20 seconds, and the resulting mixture is stirred for about 15 minutes. An exotherm and viscosity rise are noted. A smooth, white dispersion is obtained, which contains 20 percent solids. The solids from the preformed dispersion constitute 25 percent of the solids of the final product. This product has a viscosity of 10,100 cps at 25° C. as measured on a Brookfield viscometer using a #5 spindle. It exhibits a bimodal particle size distribution, with most particles having sizes of about 500 and about 4500 Angstroms. This dispersion is referred to herein as Dispersion Sample No. 1.

In a similar manner, Dispersion Sample Nos. 2-6 are prepared, differing only in the amount of dilution of Preformed Dispersion A. All of these Samples have 20 percent solids. In preparing each Sample, Preformed Dispersion A is diluted sufficiently with Polyol A that the proportion of the product solids content attributable to the polyurethane in Preformed Dispersion A is as indicated in Table 1 following. Similarly, the amounts of triethanolamine and TDI are chosen so that, in combination with the polyurethane in the Preformed Dispersion A, the Samples each contain 20 percent solids.

For comparison, a similar dispersion prepared at 20 percent solids but without benefit of a preformed dispersion has an average particle size of about 8000 Angstroms and a viscosity of 11,200 cps. This dispersion is referred to herein as Comparative Dispersion A.

TABLE 1

| Sample No. | Total Solids[1] | % of Product Solids from PED solids[2] | Viscosity[3] | Particle Size[4] |
|---|---|---|---|---|
| 2 | 20% | 0.5% | 7450 | 8500 |
| 3 | 20% | 2.5% | 7200 | 8500; 700 |
| 4 | 20% | 5% | 7650 | 7000; 700 |
| 5 | 20% | 10% | 6700 | 6000; 500 |
| 6 | 20% | 37.5% | 13,800 | 4000; 500 |

[1] By weight of product dispersion.
[2] The proportion of final product solids attributable to the solids from the preformed dispersion.
[3] Centipoises, measured on a Brookfield viscometer at 25° C. using a #5 spindle.
[4] Reported in Angstroms. Measured by hydrodynamic chromatography. Two values indicate bimodal distribution.

Of particular interest are the bimodal particle sizes of Sample Nos. 1 and 3-6, as well as the substantially reduced viscosity of all Samples except No. 6 as compared with Comparative Dispersion A.

C. Preparation of Flexible Molded Polyurethane Foam

Dispersion Sample Nos. 1-3 and 5 and Comparative Dispersion A are used to prepare flexible molded polyurethane foam using the formulation described in Table 2. All components except the TDI are mixed thoroughly. This blend is mixed with the TDI and poured into a 15"×15"×4½" mold which is preheated to 60° C. The mold is closed and placed in a 100° C. oven. After five minutes, the mold is removed from the oven and the foam sample is demolded. The demolded foam is crushed to 2' and again to 1'. Physical properties of the resulting foams are as reported in Table 3. Shrinkage is measured on uncrushed foam by bisecting the foam sample and measuring the height of the foam at the point of maximum shrinkage along the cut. The difference between the height at the point of maximum shrinkage and the nominal height of the foam is reported as a percentage of the nominal height.

TABLE 2

| Component | Parts by Weight |
| --- | --- |
| Dispersion[1] | 50 |
| Polyol A | 50 |
| Water | 4.0 |
| Diethanolamine | 1.5 |
| Catalyst A[2] | 0.15 |
| Amine Catalyst[3] | 0.45 |
| Silicone Surfactant | 1.0 |
| TDI[4] | 100 index |

[1]As indicated in Table 3.
[2]Bis(N,N-dimethylaminoethyl)ether.
[3]A 33% solution of triethylene diamine in dipropylene glycol.
[4]An 80/20 mixture of 2,4- and 2,6 isomers.

TABLE 3

| Foam Property | Dispersion or Comparative Dispersion | | | | |
| --- | --- | --- | --- | --- | --- |
| | 2 | 3 | 5 | 1 | A* |
| % of Product Solids from PFD solids[1] | 0.5 | 2.5 | 5 | 25 | 0 |
| Shrinkage, % | 53 | 46 | 23 | 7 | 54 |
| 65% IFD, N[2] | 411 | 392 | 390 | 420 | 412 |
| Modulus[2] | 2.6 | 2.6 | 2.6 | 2.6 | 2.6 |
| Tensile, KPa[2] | 139 | 146 | 135 | 151 | 126 |
| Tear, N/m[2] | 285 | 290 | 263 | 215 | 255 |
| Elongation, %[2] | 122 | 132 | 122 | 119 | 115 |
| Compression Set, %[2] | 22 | 19 | 16 | 15 | 23 |
| Core Density, kg/m[3] | 28.9 | 28.8 | 29.2 | 32.0 | 28.9 |

*Not an example of this invention.
[1]See note 2 of Table 1.
[2]ASTM D-3754

As can be seen from the data in Table 3, reduced shrinkage is obtained in all cases, as compared with the control. Particularly good improvements are seen with Samples 1, 3 and 5, especially 1 and 5, where very substantial reductions in shrinkage are obtained. In addition, significant improvements in tensile strength, elongation and compression set are obtained without loss in other properties.

EXAMPLE 2

A preformed dispersion is prepared in the same general manner as that in Example 1-A, except the ratios of components are such that the preformed dispersion has a solids content of 20 percent by weight. This preformed dispersion is referred to herein as Preformed Dispersion B. It has particles with an average size of about 8000 Angstroms and a viscosity of 11,200 cps at 25° C.

In the same general manner as described in Example 1-B, Preformed Dispersion B is used to make Dispersion Sample Nos. 7-12. Each is a 20 percent solids dispersion prepared using varying amounts of preformed dispersion as indicated in Table 4.

TABLE 4

| Dispersion Sample No. | % of Product Solids from PFD solids[1] | Total Solids[2] | Viscosity[3] | Particle Size[4] |
| --- | --- | --- | --- | --- |
| 7 | 0.5% | 20% | 8450 | >10,000; 8000 |
| 8 | 5% | 20% | 9350 | >10,000; 5500 |
| 9 | 10% | 20% | 12,000 | >10,000; 5000 |
| 10 | 25% | 20% | 13,200 | >10,000; 3500 |
| 11 | 35% | 20% | 18,200 | >10,000; 2500 |
| 12 | 50% | 20% | 39,200 | >10,000; 1500 |

[1]See note 2 of Table 1.
[2]By weight of the product dispersion.
[3]Centipoises, measured on a Brookfield viscometer at 25° C. using a #5 spindle.
[4]Reported in Angstroms. Measured by hydrodynamic chromatography. Two values indicate bimodal distribution.

A bimodal distribution is obtained in all Samples, and some Samples show a decreased viscosity compared with Comparative Dispersion A.

Using the general procedure described in Example 1-C, flexible polyurethane foams are prepared using Dispersion Sample Nos. 8 and 10. The resulting foams have properties as reported in Table 5 following.

TABLE 5

| Foam Property | Dispersion Sample No. | |
| --- | --- | --- |
| | 8 | 10 |
| % of Product Solids from PFD solids[1] | 5.0 | 25.0 |
| Shrinkage, % | 34 | 20 |
| 65% IFD, N[2] | 393 | 399 |
| Modulus[2] | 2.5 | 2.6 |
| Tensile, KPa[2] | 127 | 132 |
| Tear, N/m[2] | 263 | 243 |
| Elongation, %[2] | 115 | 114 |
| Compression Set, %[2] | 18 | 18 |
| Core Density, kg/m[3] | 28.8 | 28.9 |

[1]See note 2 of Table 1.
[2]ASTM D-3754

Again, substantial improvements in shrinkage and compression set are obtained, as compared with Comparative Dispersion A, with other physical properties not being significantly changed.

EXAMPLE 3

A preformed dispersion is prepared in the same general manner as that in Example 1-A, except that the temperature of the components at the beginning of the reaction is 45° C., and 44.2 parts triethanolamine and 55.8 parts TDI are used. The resulting dispersion is referred to as Preformed Dispersion C. It has a solids content of 10 percent by weight with an average particle size of 4200 Angstroms and a viscosity of 2340 cps at 25° C.

In the same general manner as described in Example 1-B, Preformed Dispersion C is used to make Dispersion Samples 13-16. Each is a 20 percent solids dispersion prepared using varying amounts of Preformed Dispersion C as indicated in Table 6. Also, Dispersion Samples 13-16 are used to make polyurethane foams using the general procedure described in Example 1-C and foam shrinkage results were determined as described before. The viscosity and particle size of the dispersions and the shrinkage results of the foams are as reported in Table 6.

TABLE 6

| Property | Dispersion Sample No. | | | | |
|---|---|---|---|---|---|
| | 13 | 14 | 15 | 16 | Control* |
| % of Product Solids from PFD Solids[1] | 2.5% | 5% | 12.5% | 25% | 0 |
| Total Solids[2] | 20% | 20% | 20% | 20% | 20% |
| Viscosity[3] | 5500 | 7850 | 7100 | 10,100 | 11,200 |
| Particle Size[4] | >10000; 4800 | >10000; 3200 | 9000; 1600 | 7100; 600 | 8000 |
| Foam Shrinkage | 42% | 24% | 4% | 4% | 54% |

*Comparative Dispersion A - Not an example of this invention.
[1]See Note 2 of Table 1.
[2]By weight of the product dispersion.
[3]Centipoises, measured on a Brookfield viscometer at 25° C. using a #5 spindle.
[4]Reported in Angstroms, as measured by hydrodynamic chromatography. Two values indicate bimodal distribution.

As can be seen from the data in Table 6, reduced shrinkage and viscosity are obtained in all cases, compared with the control.

Dispersion Sample No. 15 is used to make a polyurethane foam using the same formulation as described in Example 1. The foam is prepared on a low pressure foam machine. The physical properties of the foam are reported in Table 7. For comparison, a similar foam is prepared in like manner, except Comparative Dispersion A is used instead of Dispersion Sample No. 15. The properties of the resulting foam are also reported in Table 7. Cure ratings are determined by impressing each of four replicate, foam samples with a jig containing four indenter feet to regionally deflect the foam to 1", ¾", ½" and ¼" residual thickness. The samples are so impressed for periods of 15, 30, 45 and 60 seconds, respectively. The jig is then removed and the percentage loss of foam height is measured at each point of deflection. This data is fitted into the following form.

| Deflection Time (sec) | Deflection to: | | | |
|---|---|---|---|---|
| | 1" | ¾" | ½" | ¼" |
| 15 | A | B | C | D |
| 30 | E | F | G | H |
| 45 | I | J | K | L |
| 60 | M | N | O | P |

The cure rating is calculated by adding the values of A through P. Since smaller losses in foam height are desired, small cure ratings indicate superior results.

TABLE 7

| Property | Dispersion Sample No. | |
|---|---|---|
| | A* | 15 |
| Density, lb/ft 3 | 1.84 | 1.92 |
| Tensile Str., psi[1] | 21.6 | 23.9 |
| Elongation, %[1] | 155 | 169 |
| Tear Str., lb/in[1] | 1.06 | 1.29 |
| Resiliency, %[1] | 56 | 50 |
| 50% HACS, %[1] | 80 | 66 |
| ILD, 25%, lb[1] | 28 | 28 |
| ILD, 65%, lb[1] | 80 | 80 |
| ILD, return 25%, lb[1] | 21 | 22 |
| Air flow, uncrushed[2] | 1.6 | 1.4 |
| Air flow, crushed[2] | 2.8 | 2.4 |

TABLE 7-continued

| Property | Dispersion Sample No. | |
|---|---|---|
| | A* | 15 |
| Cure rating[3] | 208 | 100 |

*Not an example of this invention.
[1]ASTM D-3754. HACS is humid aged compression set. ILD is indentation load deflection.
[2]Air flow values reported in cubic foot of air per minute.
[3]Determined by method discussed in text. Smaller values indicate superior cure.

As can be seen from the data in Table 7, the properties of the foam made using Dispersion Sample No. 15 are equivalent or superior to those obtained using the Comparative Dispersion. In particular, the cure obtained with Dispersion Sample No. 15 is markedly superior, and improvements in humid aged compression set, tensile, elongation and tear strength are also seen.

EXAMPLE 4

Two duplicate preformed dispersions are made as described in Example 1-A, except that in each 44.2 parts of triethanolamine and 55.8 parts of TDI are used. These preformed dispersions are then blended to provide Preformed Dispersion D, which contains 10 percent solids and has a viscosity of 3240 cps at 25° C. The average particle size is 2200 Angstroms.

Fifty parts by weight of Preformed Dispersion D are diluted with 755 parts of Polyol B in which is dissolved 0.2 part dibutyltindilaurate. Polyol B is a 1200 equivalent weight, nominally trifunctional random copolymer of 88 percent propylene oxide and 12 percent ethylene oxide) which contains mostly secondary hydroxyl groups. To the resulting mixture are added 86.2 parts triethanolamine. The mixture is then heated to 36° C., and with stirring 108.8 parts of TDI are added over 23 seconds. An exotherm is noted. Stirring is continued for about fifteen minutes, at which time a smooth dispersion containing 20 percent solids is obtained. The solids from the preformed dispersion constitutes 2.5 percent of the solids of the product dispersion. The product dispersion has a viscosity of 3800 cps and a bimodal particle size distribution, with smaller particles having an average diameter of about 5400 Angstroms and larger particles having an average diameter in excess of 10,000 Angstroms.

This product dispersion is suitable for preparing general purpose slabstock foam.

What is claimed is:

1. A dispersion of polyurethane and/or polyurea particles in an isocyanate-reactive material having an equivalent weight greater than 400, wherein said particles have a bimodal particle size distribution wherein at least about 60 volume percent of the particles fall into two discrete size ranges, about 5 to about 75 volume percent of said particles in said discrete size ranges, being larger particles having an average particle size, as measured by hydrodynamic chromatography (HDC), of at least about 2000, and about 25 to about 95 volume percent of the particles in said discrete size ranges being smaller particles having an average particle size, as measured by HDC, of about 100 to about 7000 Angstroms.

2. The dispersion of claim 1 wherein said dispersion has a solids content of about 0.5 to about 40 percent by weight.

3. The dispersion of claim 2 wherein said larger particles have an average particle size from about 2000 to about 10,000 Angstroms, and said smaller particles have an average particle size from about 100 to about 4000 Angstroms.

4. The dispersion of claim 3 wherein said isocyanate-reactive material is a polyether polyol having an equivalent weight from about 700 to about 3000 and a functionality of about 1.8 to about 4.

5. The dispersion of claim 4 wherein said dispersed particles are polyurethane particles.

6. The dispersion of claim 5 wherein said polyether polyol is an oxyethylene-capped poly(propylene oxide).

7. The dispersion of claim 5 wherein said polyether polyol is a mixture of (1) a 800–2000 equivalent weight nominally 2–4 functional poly(propylene oxide) which is end-capped with about 5 to about 25 weight percent ethylene oxide and (2) a 500–2500 equivalent weight, nominally 1.8–4 functional homopolymer of propylene oxide or random copolymer of propylene oxide and a minor amount of ethylene oxide having at least 90 percent secondary hydroxyl groups, the weight ratio of polyether polyol (1) to polyether polyol (2) being from about 1:2 to about 1:50.

8. A process for preparing a product polyurethane and/or polyurea dispersion comprising reacting
(A) a polyisocyanate with
(B) a coreactant material having a equivalent weight of up to 400 and a plurality of active hydrogen atoms attached to oxygen or nitrogen atoms, in the presence of
(C) a preformed solution or dispersion of a material containing urethane and/or urea groups in an isocyanate-reactive material which has an equivalent weight greater than 400, wherein
(i) said product dispersion contains about 0.5 to about 40 weight percent solids, based on the weight of the product dispersion, and
(ii) the material containing urethane and/or urea groups dissolved and or dispersed in the preformed solution or dispersion constitutes from about 0.5 to about 50 percent of the weight of the solids of the product dispersion.

9. The process of claim 8 wherein said product dispersion has a solids content of about 5 to about 30 percent by weight.

10. The process of claim 9 wherein said product dispersion contains polyurethane particles.

11. The process of claim 10 wherein said isocyanate-reactive material is a polyether polyol having an equivalent weight from about 700 to about 3000 and a functionality of about 1.8 to about 4.

12. The process of claim 11 wherein said polyether polyol is an oxyethylene-capped poly(propylene oxide).

13. The process of claim 10 wherein said isocyanate-reactive material in the preformed solution or dispersion is an oxyethylene-capped poly(propylene oxide) having an equivalent weight from about 700 to about 3000 and a functionality of about 1.8 to about 4, and said reaction is further conducted in the presence of
(D) a 500–2500 equivalent weight, nominally 1.8–4 functional homopolymer of propylene oxide or random copolymer of propylene oxide and a minor amount of ethylene oxide having at least 90 percent secondary hydroxyl groups,
the weight ratio of the isocyanate-reactive material in the preformed solution or dispersion to component (D) being from about 1:2 to about 1:50.

14. The process of claim 12 wherein the coreactant is an alkanolamine and said polyisocyanate is TDI, MDI, PMDI or a mixture thereof.

15. The process of claim 4 wherein said material containing urethane and/or urea groups in the preformed dispersion is the reaction product of an alkanolamine and TDI, MDI, PMDI or a mixture thereof.

16. The process of claim 8 wherein said product dispersion has a bimodal particle size distribution wherein at least about 60 volume percent of the particles fall into two discrete size ranges, about 5 to about 75 volume percent of said particles in the two discrete size ranges being larger particles having an average particle size, as measured by (HDC), of at least about 2000 Angstroms, and about 25 to about 95 volume percent in the two discrete size ranges of the particles being smaller particles having an average particle size, as measured by HDC, of about 100 to about 7000 Angstroms.

17. The process of claim 11 wherein said preformed solution or dispersion is previously treated to remove particulate matter.

18. A dispersion prepared according to the process of claim 8.

19. A dispersion prepared according to the process of claim 16.

20. A reaction product of a polyisocyanate with an active hydrogen containing composition comprising the dispersion of claim 1.

21. A reaction product of a polyisocyanate with an active hydrogen containing composition comprising the dispersion of claim 6.

22. A reaction product of a polyisocyanate with an active hydrogen containing composition comprising the dispersion of claim 7.

23. A reaction product of a polyisocyanate with an active hydrogen containing composition comprising the dispersion of claim 18.

* * * * *